United States Patent
DiCiccio et al.

(10) Patent No.: US 11,866,531 B2
(45) Date of Patent: Jan. 9, 2024

(54) OIL-RESISTANT LENS MATERIAL AND OPHTHALMIC DEVICES

(71) Applicant: Twenty Twenty Therapeutics LLC, South San Francisco, CA (US)

(72) Inventors: Angela DiCiccio, San Francisco, CA (US); Daniel Otts, Pleasanton, CA (US); Stein Kuiper, South San Francisco, CA (US)

(73) Assignee: Twenty Twenty Therapeutrics LLC, South San Francisco, CA (US)

( * ) Notice: Subject to any disclaimer, the term of this patent is extended or adjusted under 35 U.S.C. 154(b) by 619 days.

(21) Appl. No.: 17/031,292

(22) Filed: Sep. 24, 2020

(65) Prior Publication Data

US 2021/0095063 A1    Apr. 1, 2021

Related U.S. Application Data

(60) Provisional application No. 62/908,451, filed on Sep. 30, 2019.

(51) Int. Cl.
| | | |
|---|---|---|
| *C08F 220/24* | (2006.01) | |
| *G02B 1/18* | (2015.01) | |
| *C08F 230/08* | (2006.01) | |
| *G02B 1/04* | (2006.01) | |
| *G02C 7/10* | (2006.01) | |
| *C09K 3/10* | (2006.01) | |
| *G02C 7/04* | (2006.01) | |

(52) U.S. Cl.
CPC .......... *C08F 220/24* (2013.01); *C08F 230/08* (2013.01); *C09K 3/1009* (2013.01); *G02B 1/043* (2013.01); *G02B 1/18* (2015.01); *G02C 7/101* (2013.01); *G02C 7/04* (2013.01)

(58) Field of Classification Search
CPC .... C08F 220/24; C08F 230/08; G02B 18/043; C09K 3/1009
See application file for complete search history.

(56) References Cited

U.S. PATENT DOCUMENTS

| | | |
|---|---|---|
| 4,814,402 A | 3/1989 | Nakashima et al. |
| 2010/0110372 A1 | 5/2010 | Pugh et al. |
| 2013/0171546 A1 | 7/2013 | White et al. |
| 2018/0088352 A1 | 3/2018 | Kennedy et al. |

FOREIGN PATENT DOCUMENTS

| | | |
|---|---|---|
| EP | 2328742 A1 | 6/2011 |
| GB | 2163173 A | 2/1986 |
| JP | 63159820 A | 7/1988 |

OTHER PUBLICATIONS

International Search Report and Written Opinion, dated Jan. 18, 2021, in corresponding International Patent Application No. PCT/US2020/053093, 15 pages.

*Primary Examiner* — Edward J Cain
(74) *Attorney, Agent, or Firm* — CHRISTENSEN O'CONNOR JOHNSON KINDNESS PLLC

(57) ABSTRACT

Lens materials and ophthalmic devices including lens materials that are oxygen permeable and resistant to oil absorption are described. In an embodiment, the lens material includes a copolymer composed of repeating units including: a fluorinated acrylate repeating unit; and a silicon-containing repeating unit, wherein a mass:mass ratio of the fluorinated acrylate repeating unit to the silicon-containing repeating unit is greater than or equal to 2:1.

18 Claims, 4 Drawing Sheets

OIL-RESISTANT LENS MATERIAL AND OPHTHALMIC DEVICES

CROSS-REFERENCE(S) TO RELATED APPLICATIONS

This application claims the benefit of U.S. Provisional Application No. 62/908,451, filed Sep. 30, 2019, which is hereby incorporated by reference in its entirety.

TECHNICAL FIELD

This disclosure relates generally to lens material for ophthalmic devices, and in particular but not exclusively, relates to lens material for electrowetting ophthalmic devices.

BACKGROUND INFORMATION

Certain ophthalmic devices provide accommodating changes in optical power based upon electrowetting. Such electrowetting generally operates by changing the apparent surface energy of a dielectric coating on an electrode from hydrophobic to hydrophilic when bias is applied, and vice versa. The change in apparent surface energy may cause an interface between two immiscible liquids of different refractive indices and polarity, such as an oil and a saline solution, to change shape, thereby providing a lensing effect. A voltage applied to the electrode may attract or repel one of the two immiscible liquids, which causes the shape of the interface to change.

Lens materials encasing a non-polar liquid, such as an oil, may absorb a portion of the non-polar liquid. Such absorption can lead to degradation of the lens material and a deleterious and/or unintended change in optical properties of the ophthalmic device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
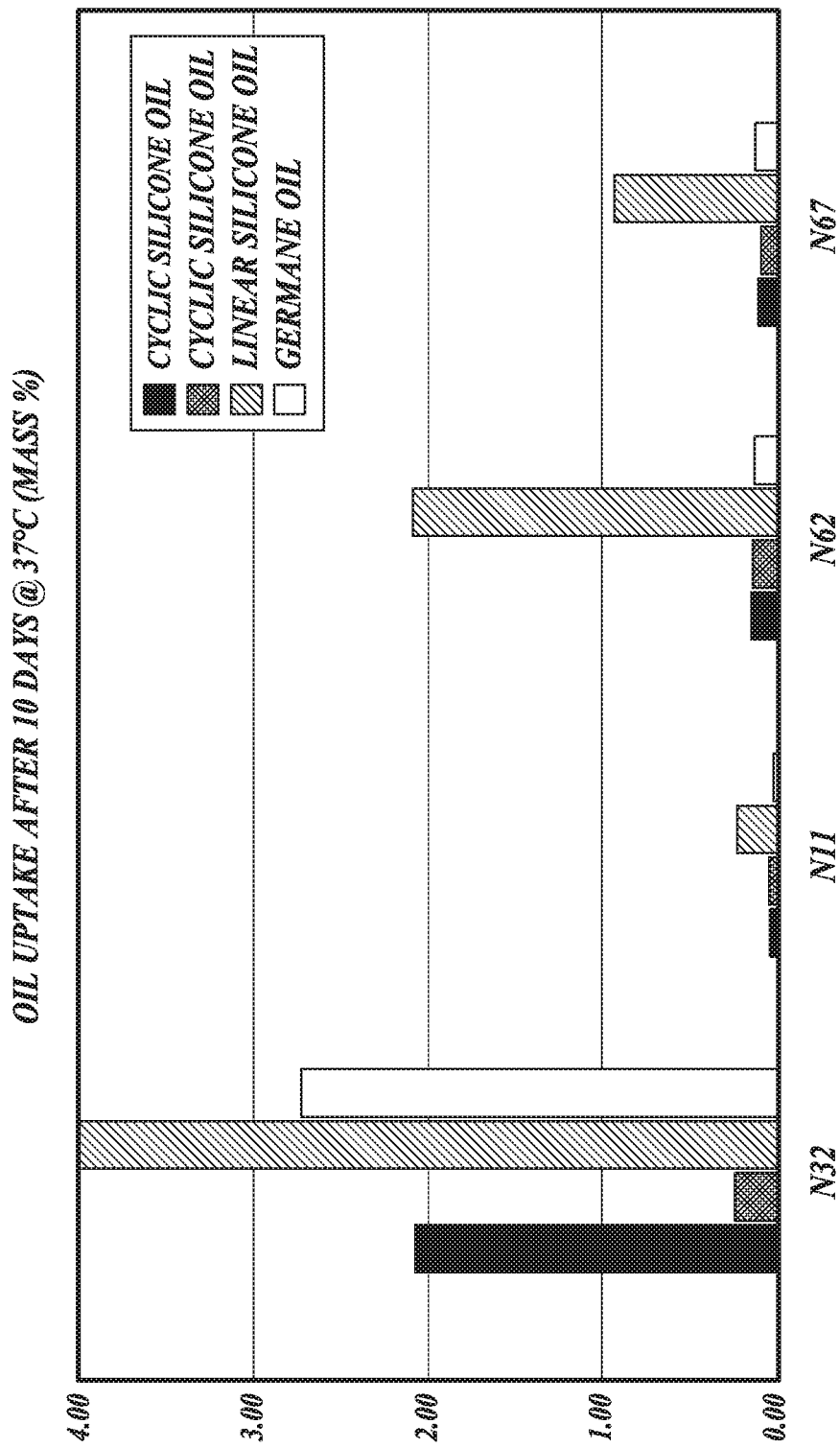
FIG. 1 is a graphic illustration of oil uptake by lens materials, in accordance with an embodiment of the disclosure.

Embodiments of a lens material and ophthalmic device having a resistance to oil absorption are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Electrowetting ophthalmic devices may encase a nonpolar liquid, such as an oil, in a lens material. Conventional lens materials can absorb at least a portion of the oil over time, which can degrade the lens material and/or change optical properties of the electrowetting ophthalmic device.

As set forth in greater detail below, the present disclosure provides lens materials for use in ophthalmic devices, such as electrowetting ophthalmic devices, that are resistant to oil absorption. Accordingly, ophthalmic devices incorporating the lens materials described herein absorb less oil, such as oil used in electrowetting ophthalmic devices compared to ophthalmic devices incorporating conventional lens materials. As also set forth in greater detail below, the lens materials described herein also advantageously possesses one or more characteristics selected from relatively high oxygen permeability, optical transmissivity, colorlessness, form stability, and negligible release of contaminants into an oil. Such properties make the lens materials of the present disclosure particularly suitable for incorporation in ophthalmic devices, such as electrowetting ophthalmic devices.

Accordingly, in an aspect, the present disclosure provides a lens material including a copolymer composed of repeating units including a fluorinated repeating unit, such as a fluorinated acrylate repeating unit; and a silicon-containing repeating unit. In an embodiment, a mass:mass ratio of the fluorinated acrylate repeating unit to the silicon-containing repeating unit is greater than or equal to 2:1. As discussed further herein with respect to the Examples of the present disclosure, such a mass:mass ratio provides oil absorption resistance and oxygen permeability suitable for use with ophthalmic devices, such as electrowetting ophthalmic devices, that contact an oil.

Representative copolymers include random and block copolymers. In one embodiment, the copolymers are obtainable by copolymerizing, such as by photo-initiation, one or more of the monomers described herein with one or more second co-monomers. In an embodiment, the co-monomers may be copolymerized by cast molding, such as in conjunction with photo-initiation with a photoinitiator.

As above, in an embodiment, the lens materials of the present disclosure include a copolymer comprising a fluorinated acrylate repeating unit. Such fluorinated acrylate repeating units include one or more fluorine atoms, such as described further with respect to the repeating units of formula (1). Inclusion of the fluorinated acrylate repeating units in the copolymers of the lens materials generally increases strength and structural rigidity of the lens material.

In an embodiment, the fluorinated acrylate repeating unit has a formula (1):

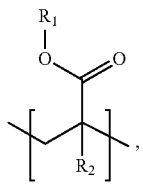
(1)

wherein
$R_1$ is selected from the group consisting of fluorinated straight-chain alkyl groups, fluorinated branched alkyl groups, fluorinated cyclic alkyl groups, fluorinated aryl groups, and fluorinated alkenyl groups; and
$R_2$ is selected from the group consisting of H, straight-chain alkyl groups, branched alkyl groups, cyclic alkyl groups, alkenyl groups, and aryl groups.

The term "alkyl" as used herein, means a straight- or branched-chain hydrocarbon containing from 1 to 10 carbon atoms unless otherwise specified. Representative examples of alkyl groups include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkenyl" as used herein, means a straight- or branched-chain hydrocarbon containing from 2 to 10 carbons, unless otherwise specified, and containing at least one carbon-carbon double bond. Representative examples of alkenyl groups include, but are not limited to, ethenyl, 2-propenyl, 2-methyl-2 propenyl 3-butenyl, 4-pentenyl, 5-hexenyl, 2-heptenyl, 2-methyl-1-heptenyl, 3-decenyl, and 3,1-dimethylocta-2,6-dienyl.

The term "alkynyl" as used herein, means a straight- or branched-chain hydrocarbon group containing from 2 to 10 carbon atoms and containing at least one carbon-carbon triple bond. Representative examples of alkenyl groups include, but are not limited, to acetylenyl, 1-propynyl, 2-propynyl, 3-butynyl, 2-pentynyl, and 1-butynyl.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system.

The terms "cycloalkyl" and "cyclic alkyl," which are used herein interchangeably, mean a monocyclic or a bicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated.

The terms "fluorinated alkyl", "fluorinated alkenyl" and "fluorinated aryl" refer to an alkyl, alkenyl or aryl group, as the case may be, which is substituted with one or more fluorine atoms.

In an embodiment, the fluorinated acrylate repeating unit is derived from a fluorinated methacrylate monomer selected from the group consisting of 2,2,2-trifluoroethyl methacrylate, 2,2,2-trifluoroethyl acrylate, 2,2,3,3,-tetrafluoropropyl methacrylate, 2,2,3,3-tetrafluoropropyl acrylate, 2,2,3,3,3-pentafluoropropyl methacrylate, 2,2,3,3,3-pentafluoropropyl acrylate, hexafluoroisopropyl methacrylate, 2,2,2-trifluoro-1-trifluoromethylethyl acrylate, 2,2,3,3-tetrafluoro-tert-amyl methacrylate, 2,2,3,3-tetrafluoro-tert-amyl acrylate, 2,2,3,4, 4,4-hexafluorobutyl methacrylate, 2,2,3,4,4,4-hexafluorobutyl acrylate, 2,2,3,4,4,4-hexafluoro-tert-hexyl methacrylate, 2,2,3,4,4,4-hexafluoro-tert-hexyl acrylate, 2,2,3,3,4,4,5,5-octafluoropentyl methacrylate, 2,2,3,3,4,4,5,5-octafluoropentyl acrylate, 2,3,4,5,5,5-hexafluoro-2,4-bis(trifluoromethyl)pentyl methacrylate, 2,3,4,5,5,5-hexafluoro-2,4-bis(trifluoromethyl)pentyl acrylate, 2,2,3,3,4,5,5,6,6,7,7-dodecafluoroheptyl methacrylate, 2,2,3,3,4,4,5,5,6,6,7,7-dodecafluoroheptyl acrylate, 2-hydroxy-4,4,5,5,6,7,7,7-octafluoro-6-trifluoromethylheptyl methacrylate, 2-hydroxy-4,4,5,5,6,7,7-octafluoro-6-trifluoromethylheptyl acrylate, 2-hydroxy-4,4,5,5,6,6,7,7,8,9,9,9-dodecafluoro-8-trifluoromethylnonyl methacrylate, 2-hydroxy-4,4,5,5,6,6,7,7,8,9,9,9-dodecafluoro-8-trifluoromethylnonyl acrylate, 2-hydroxy-4,4,5,5,6,6,7,7,8,8,9,9,10,11,11,11-hexadecafluoro-10-trifluoromethylundecyl methacrylate, and 2-hydroxy-4,4,5,5,6,6,7,7,8,8,9,9,10,11,11,11-hexadecafluoro-10-trifluoromethylundecyl acrylate.

In an embodiment, the fluorinated acrylate repeating unit is derived from a fluorinated methacrylate monomer selected from the group consisting of a hexafluoroisopropyl methacrylate monomer, a trifluoroethyl methacrylate monomer, and combinations thereof. In an embodiment, the fluorinated acrylate repeating unit is derived from a trifluoroethyl methacrylate monomer. In an embodiment, the fluorinated acrylate repeating unit is derived from a hexafluoroisopropyl methacrylate monomer.

As above, the lens materials of the present disclosure include a copolymer comprising a silicon-containing repeating unit. In an embodiment, such silicon-containing repeating units can include a siloxane moiety. In an embodiment, the silicon-containing repeating unit is derived from a silyl methacrylate monomer, such as is shown with respect to the structure of formula (2). The silicon-containing units described herein are generally highly oxygen permeable and impart oxygen permeability to the copolymer due to their inclusion in the copolymers of the lens materials. In an embodiment, the silicon-containing repeating unit is derived from a monomer selected from the group consisting of a silyl methacrylate monomer, a silyl styrene monomer, and combinations thereof.

In an embodiment, the silicon-containing repeating unit has a formula (2):

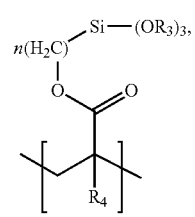
(2)

wherein
each $R_3$ is independently selected from the group consisting of straight-chain alkyl groups, branched alkyl groups, cyclic alkyl groups, aryl groups, and alkenyl groups;
$R_4$ is selected from the group consisting of H, straight-chain alkyl groups, branched alkyl groups, cyclic alkyl groups, alkenyl groups, and aryl groups; and n is an integer in a range of 1 to 20.

In an embodiment, the silicon-containing repeating unit is derived from a silyl methacrylate monomer selected from the group consisting of pentamethyldisiloxanylmethyl methacrylate, pentamethyldisiloxanylmethyl acrylate, pentamethyldisiloxanylpropyl methacrylate, pentamethyldisiloxanylpropyl acrylate, methylbis(trimethylsiloxy)silylpropyl methacrylate, methylbis(trimethylsiloxy)silylpropyl acrylate, tris(trimethylsiloxy)silylpropyl methacrylate, tris(trimethylsiloxy)silylpropyl acrylate, mono[methylbis(trimethylsiloxy)siloxy]bis(trimethylsiloxy)silylpropyl methacrylate, mono[methylbis(trimethylsiloxy)siloxy]bis(trimethylsiloxy)silylpropyl acrylate, tris[methylbis(trimethylsiloxy)siloxy]silylpropyl methacrylate, tris[methylbis(trimethylsiloxy)siloxy]silylpropyl acrylate, methylbis(trimethylsiloxy) silylpropylglycerol methacrylate, methylbis(trimethylsiloxy)silylpropylglycerol acrylate, tris(trimethylsiloxy)silylpropylglycerol methacrylate, tris(trimethylsiloxy)silylpropylglycerol acrylate, mono[methylbis(trimethylsiloxy)siloxy]bis(trimethylsiloxy)silylpropylglycerol methacrylate, mono[methylbis(trimethylsiloxy)siloxy]bis(trimethylsiloxy)silylpropylglycerol acrylate, trimethylsilylethyltetramethyldisiloxanylpropylglycerol methacrylate, trimethylsilylethyltetramethyldisiloxanylpropylglycerol acrylate, trimethylsilylmethyl methacrylate, trimethylsilylmethyl acrylate, trimethylsilylpropyl methacrylate, trimethylsilylpropyl acrylate, trimethylsilylpropylglycerol acrylate, pentamethyldisiloxanylpropylglycerol acrylate, trimethylsilylpropylglycerol methacrylate, pentamethyldisiloxanylpropylglycerol methacrylate, methylbis(trimethylsiloxy)silylethyltetramethyldisiloxanylmethyl methacrylate, methylbis(trimethylsiloxy)silylethyltetramethyldisiloxanylmethyl acrylate, tetramethyltriisopropylcyclotetrasiloxanylpropyl methacrylate, tetramethyltriisopropylcyclotetrasiloxanylpropyl acrylate, tetramethyltriisopropylcyclotetrasiloxybis(trimethylsiloxy)silylpropyl methacrylate, tetramethylisopropylcyclotetrasiloxybis(trimethylsiloxy)silylpropyl acrylate, and 3-[tris(trimethoxysiloxy)silyl]propyl methacrylate. In an embodiment, the silicon-containing repeating unit is 3-[tris(trimethylsiloxy)silyl]propyl methacrylate.

In an embodiment, the copolymer includes repeating units derived from hexafluoroisopropylmethacrylate and 3-[tris(trimethylsiloxy)silyl]propyl methacrylate monomers. In an embodiment, the copolymer includes repeating units derived from trifluoroethylmethacrylate, hexafluoroisopropylmethacrylate, and 3-[tris(trimethylsiloxy)silyl]propyl methacrylate monomers. In an embodiment, the copolymer includes repeating units derived from trifluoroethylmethacrylate and 3-[tris(trimethylsiloxy)silyl]propyl methacrylate monomers.

As above, in an embodiment, a mass:mass ratio of the fluorinated acrylate repeating unit to the silicon-containing repeating unit is greater than or equal to 2:1. As shown in the Examples of the present application and FIGS. 1 and 2, lens materials including a copolymer having such a mass:mass ratio of fluorinated acrylate repeating units to silicon-containing repeating units generally have high oxygen permeability, optical transmissivity, colorlessness, structural rigidity, low oil uptake under relevant temperature conditions, and low release of contaminants into an oil. In this regard, the lens materials of the present disclosure are suitable for incorporation into dynamic-focus liquid lenses, such as an electrowetting ophthalmic device for dynamic correction of, for example, presbyopia.

Accordingly, in an embodiment, the mass:mass ratio of the fluorinated acrylate repeating unit to the silicon-containing repeating unit is in a range of about 2:1 to about 100:1. In an embodiment, the mass:mass ratio of the fluorinated acrylate repeating unit to the silicon-containing repeating unit is in a range of about 2:1 to about 10:1. In an embodiment, the mass:mass ratio of the fluorinated acrylate repeating unit to the silicon-containing repeating unit is in a range of about 2:1 to about 5:1. In an embodiment, the mass:mass ratio of the fluorinated acrylate repeating unit to the silicon-containing repeating unit is in a range of about 2:1 to about 3:1.

In an embodiment, suitable fluorinated acrylate repeating units include hexafluoroisopropylmethacrylate (HFMA), trifluoroethylmethacrylate (TFEMA), and combinations thereof. In an embodiment, a suitable silicon-containing repeating unit is 3-[Tris(trimethylsiloxy)silyl]propyl methacrylate (TRIS-MA). In an embodiment, suitable fluorinated acrylate repeating units include HFMA, TFEMA, and combinations thereof, and the silicon-containing repeating unit is TRIS-MA, wherein a mass:mass ratio of the fluorinated acrylate repeating unit(s) to the silicon-containing repeating unit is in a range of about 2:1 to about 3:1, about 2:1 to about 5:1, about 2:1 to about 10:1, or about 2:1 to about 100:1. In an embodiment, the fluorinated acrylate repeating unit is HFMA and the silicon-containing repeating unit is TRIS-MA, wherein a mass:mass ratio of the fluorinated acrylate repeating unit to the silicon-containing repeating unit is in a range of about 2:1 to about 3:1. In an embodiment, the fluorinated acrylate repeating units are TFEMA and HFMA and the silicon-containing repeating unit is TRIS-MA, wherein a mass:mass ratio of the fluorinated acrylate repeating unit to the silicon-containing repeating unit is in a range of about 2:1 to about 3:1. In an embodiment, the fluorinated acrylate repeating unit is TFEMA and the silicon-containing repeating unit is TRIS-MA, wherein a mass:mass ratio of the fluorinated acrylate repeating unit to the silicon-containing repeating unit is in a range of about 2:1 to about 3:1.

As above, the lens materials of the present disclosure are generally resistant to absorption of oils, particularly oils suitable for use in electrowetting ophthalmic devices, as described herein. Oil absorption resistance is important in lens materials for electrowetting ophthalmic, at least in part, because oil absorption can lead to degradation of lens materials, creation of a haze in the lens material, and changing an initial geometry of the lens material. Further, preventing or limiting oil absorption into the lens material generally extends a shelf life of an electrowetting ophthalmic device including the lens material and the oil in contact therewith.

As shown in Example 2, lens materials of the present disclosure having a mass:mass ratio of the fluorinated acrylate repeating unit to the silicon-containing repeating unit greater than or equal to 2:1 absorb low levels of oil, such as organometallic oils. In this regard, in an embodiment, the lens materials are configured to absorb less than 3 wt %, 2 wt %, or 1 wt % of an oil after contacting an excess of the oil for 10 days at about body temperature, such as at about 37° C. See FIG. 1. In an embodiment, the lens materials are configured to absorb less than 1 wt % of a cyclic silicone oil or a germane oil after contacting an excess of the oil for 10 days at about body temperature, such as at about 37° C., such as where the lens materials comprise fluorinated acrylate repeating units chosen from HFMA, TFEMA, and combinations thereof, and the silicon-containing repeating unit is TRIS-MA. In an embodiment, the lens materials are configured to absorb less than 3 wt % or less than 2 wt % of a linear silicone oil after contacting an excess of the oil for 10 days at about body temperature, such as at about 37° C., such as where the lens materials comprise fluorinated acrylate repeating units chosen from HFMA, TFEMA, and combinations thereof, and the silicon-containing repeating unit is TRIS-MA.

Likewise, in an embodiment, the lens materials are configured to absorb less than 10 wt %, 5 wt %, 2 wt %, or 1 wt % of an oil after contacting an excess of the oil for 10 days at a maximum recommended storage temperature for an electrowetting ophthalmic device, such as about 60° C. In an embodiment, the lens materials are configured to absorb less than 1 wt % of a cyclic silicone oil or a germane oil after contacting an excess of the oil for 10 days at a maximum recommended storage temperature for an electrowetting ophthalmic device, such as about 60° C., such as where the lens materials comprise fluorinated acrylate repeating units chosen from HFMA, TFEMA, and combinations thereof, and the silicon-containing repeating unit is TRIS-MA. In an embodiment, the lens materials are configured to absorb less than 10 wt %, less than 5 wt %, or less than 1 wt % of a linear silicone oil after contacting an excess of the oil for 10 days at a maximum recommended storage temperature for an electrowetting ophthalmic device, such as about 60° C., such as where the lens materials comprise fluorinated acrylate repeating units chosen from HFMA, TFEMA, and combinations thereof, and the silicon-containing repeating unit is TRIS-MA.

Figure 2:
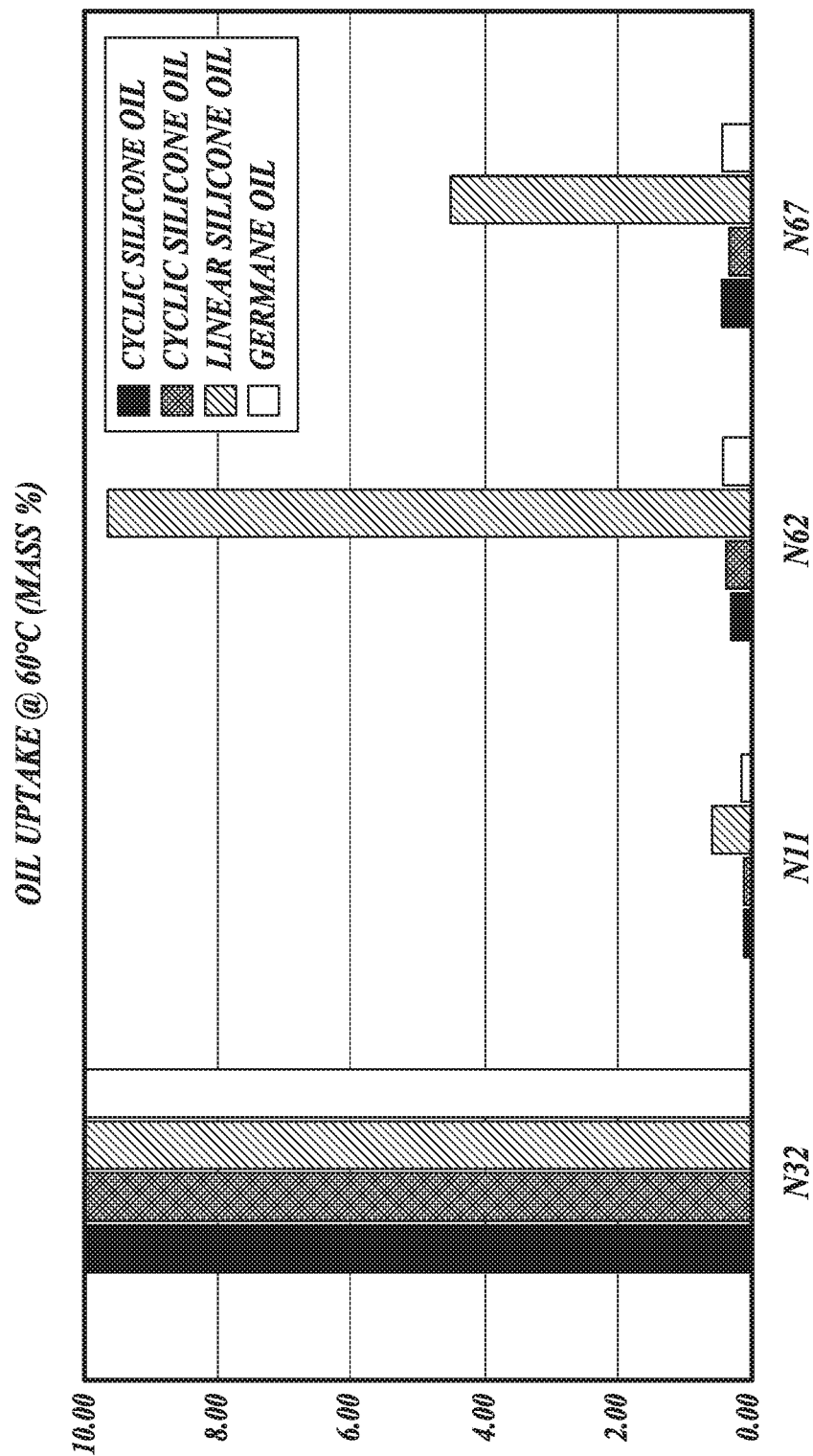
FIG. 2 is a graphic illustration of oil uptake by lens materials, in accordance with an embodiment of the disclosure.

The resistance to oil absorption of the lens materials of the present disclosure is in contrast to oil absorption of lens materials having a mass:mass ratio of a fluorinated acrylate repeating unit to a silicon-containing repeating unit less than 2:1. As shown in FIGS. 1 and 2 and discussed further herein with respect to Example 2, a copolymer, N32, having a 1:1 mass:mass ratio of a fluorinated acrylate repeating unit to a silicon-containing repeating unit absorbs far greater amounts of oil under the same conditions as those subjected to the lens materials of the present disclosure. FIGS. 1 and 2 show this copolymer, N32, absorbing 10% oil by weight. It is noted, however, that the measurement of oil absorption has a maximum of 10% oil by weight and, accordingly, the actual amount of oil absorption for such lens materials having a low fluorinated acrylate content may be much greater for particular oils at particular temperatures.

As a corollary to being generally resistant to oil absorption, the lens materials of the present disclosure also do not generally leach contaminants from within the lens materials into an oil in contact therewith. Because oil does not permeate the lens material to as great an extent as with other conventional lens materials, the lens materials described herein do not leach into an oil in contact therewith to as great an extent as with conventional lens materials. Leaching of such contaminants may negatively impact the performance of an electrowetting ophthalmic device. In this regard, leached contaminants may slow a lens accommodation response time by lowering interfacial energies, decrease a stability of an optical power of an electrowetting ophthalmic device with constant applied voltage, or cause the electrowetting ophthalmic device to stop working altogether. Ophthalmic devices incorporating the lens materials of the present disclosure are configured to avoid and/or mitigate these negative impacts due to the incorporation of such lens materials.

In an embodiment, impurities in the lens materials described herein are extracted prior to inclusion in an electrowetting ophthalmic device through exposure to one or more compounds, such as oils, suitable for use in electrowetting ophthalmic devices. Such exposure can include exposing the lens material to an oil used in an electrowetting ophthalmic device for an extended period of time and at an elevated temperature to extract such impurities. In an embodiment, such exposure includes refreshing the extraction oil at least once.

In addition to generally preventing or limiting absorption of non-polar liquids, such as oils, the lens materials of the present disclosure are also generally permeable to oxygen. Such oxygen permeability is important for the comfort of a user of an electrowetting ophthalmic device. In an embodiment, the lens materials described herein have an oxygen permeability level in a range of about 30 Dk to about 100 Dk. In an embodiment, the lens materials described herein have an oxygen permeability level in a range of about 40 Dk to about 90 Dk. In an embodiment, the lens materials described herein have an oxygen permeability level in a range of about 60 Dk to about 80 Dk. In this regard, the lens materials of the present disclosure are suitable for incorporation into an electrowetting ophthalmic device configured, for example, to be comfortably mounted to a corneal surface of an eye.

In an embodiment, the lens material includes a crosslinking agent. In an embodiment, the crosslinking agent is suitable to increase a structural rigidity of the lens material and provide chemical resistance to the lens material. In an embodiment, the crosslinking agent includes a dimethacrylate moiety. In an embodiment, the crosslinking agent includes a trimethacrylate moiety. In an embodiment, the crosslinking agent is selected from the group consisting of butanediol dimethacrylate, ethylene glycol dimethacrylate, diethylene glycol dimethacrylate, triethylene glycol dimethacrylate, propylene glycol dimethacrylate, dipropylene glycol dimethacrylate, allylmethacrylate, vinylmethacrylate, trimethylolpropane trimethacrylate, neopentyl glycol dimethacrylate, and combinations thereof. In an embodiment, the crosslinking agent is ethylene glycol dimethacrylate. In an embodiment, the crosslinking agent is neopentyl glycol dimethacrylate.

In an embodiment, the copolymer includes a photoinitiator suitable for initiating a photo-polymerization of the monomers described herein, such as in conjunction with cast molding. In an embodiment, the photoinitiator is Darocur 1173. In an embodiment, the photoinitiator is present in the lens material at about 1% w/w.

Figure 3A:
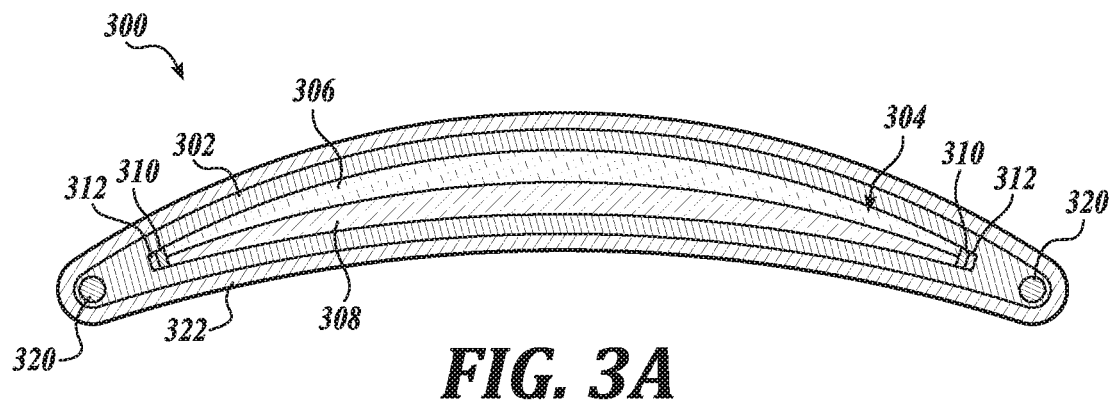
FIG. 3A is a cross-section view of an ophthalmic device, in accordance with an embodiment of the disclosure.
Figure 3B:
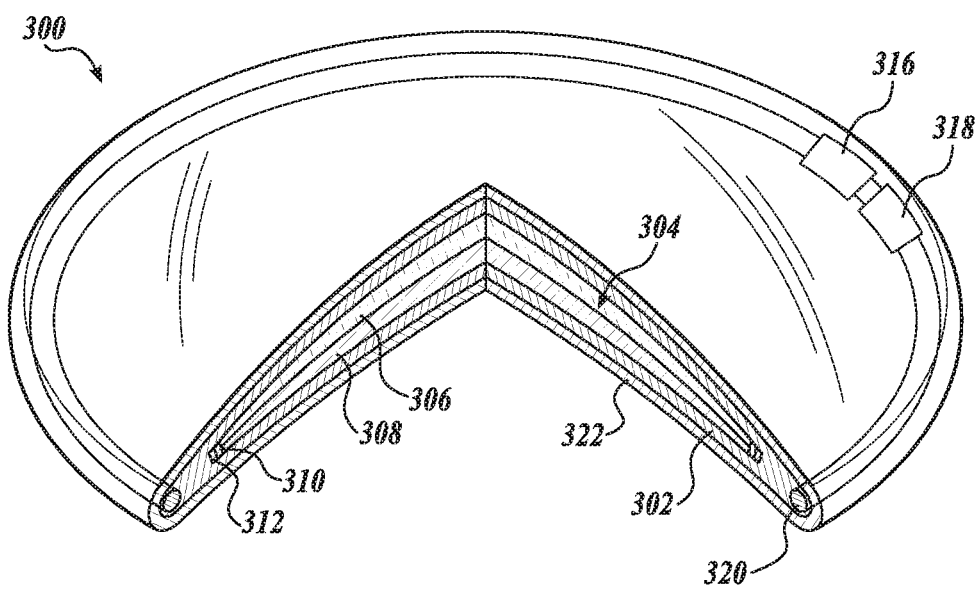
FIG. 3B is a perspective view of the ophthalmic device of FIG. 3A with a partial cutaway, in accordance with an embodiment of the disclosure.

In another aspect, the present disclosure provides an ophthalmic device including a lens material, as described herein. In an embodiment, the ophthalmic device is an electrowetting ophthalmic device including the lens material, which defines an enclosure that encases compound. In that regard, attention is directed to FIGS. 3A and 3B in which an ophthalmic device 300, in accordance with an embodiment of the disclosure, is illustrated. FIG. 3A is a cross-section view of an ophthalmic device 300. FIG. 3B is a perspective view of the ophthalmic device 300.

The ophthalmic device 300 is shown to include a lens material 302 defining an enclosure 304, a polar liquid 308 encased in the enclosure 304, non-polar liquid 306 also encased in the enclosure 304 and immiscible with the polar liquid 308, an electrode 312, a dielectric layer 310 disposed over the electrode 312 and in contact with the non-polar liquid 306 and the polar liquid 308, a wireless receiver 320 disposed in the lens material 302 for receiving wireless power from an external power source, and a hydrogel 322 encasing the lens material 302. The ophthalmic device 300 is illustrated as an electrowetting accommodating contact lens 300 shaped to mount to a corneal surface of an eye. While electrowetting accommodating contact lens 300 is described, it will be understood that other ophthalmic devices including the lens materials described herein are included within the scope of the present disclosure. In this regard, the ophthalmic devices of the present disclosure further include, for example, accommodating intraocular lenses.

In an embodiment, the polar liquid 308 has a relatively high electrical conductivity. In an embodiment, the polar liquid 308 is an aqueous saline solution 308. In an embodiment, the non-polar liquid 306 is an oil 306, such as an oil 306 having a relatively low electrical conductivity.

As above, the ophthalmic device 300 includes non-polar liquid 306. In an embodiment, the non-polar liquid is an oil 306. In an embodiment, the non-polar liquid 306 has a relatively low electrical conductivity. In an embodiment, the oil 306 includes a silicon-containing compound. In an embodiment, the oil 306 includes a plurality of silicon-containing compounds. In an embodiment, the oil 306 includes a germanium-containing compound. In an embodiment, the oil 306 includes a plurality of germanium-containing compounds. In an embodiment, the oil 306 is a mixture of compounds, such as compounds that, when separate may have a liquid or solid form.

In an embodiment, the oil 306 is an organometallic oil, such as a silicone oil or a germane oil. In an embodiment, the oil 306 is a linear silicone oil. In an embodiment, the oil 306 is a cyclic silicone oil. In an embodiment, the oil 306 is a hydrocarbon oil. Such oils do not generally permeate into the lens material 302, such as under conditions for storage and use of the ophthalmic device 300.

As described further herein with respect to the lens materials of the present disclosure, the lens material 302 is configured to limit or prevent absorption of the oil 306 into the lens material 302. In an embodiment, the lens material 302 including a fluorinated acrylate repeating unit; and a silicon-containing repeating unit, wherein a mass:mass ratio of the fluorinated acrylate repeating unit to the silicon-containing repeating unit is greater than or equal to 2:1, such as in a range of about 2:1 to about 100:1. As described in Example 2 and FIGS. 1 and 2, such lens material 302 is configured to absorb relatively small amounts of oil 306 under conditions in which the ophthalmic device 300 may be used and/or stored. In this regard, the lens material 302 is configured to absorb less than 1 wt % of the oil 306 after contacting an excess of the oil 306 for 10 days at 37° C. Likewise, the lens material 302 is configured to absorb less than 2 wt % of the oil 306 after contacting an excess of the oil 306 for 10 days at 60° C.

In an embodiment, the fluorinated acrylate repeating unit has a formula (1):

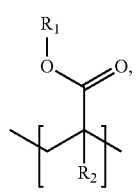

(1)

wherein
R₁ is selected from the group consisting of fluorinated straight-chain alkyl groups, fluorinated branched alkyl groups, fluorinated cyclic alkyl groups, fluorinated aryl groups, and fluorinated alkenyl groups; and
R₂ is selected from the group consisting of H, straight-chain alkyl groups, branched alkyl groups, cyclic alkyl groups, alkenyl groups, and aryl groups.

In an embodiment, the silicon-containing repeating unit has a formula (2):

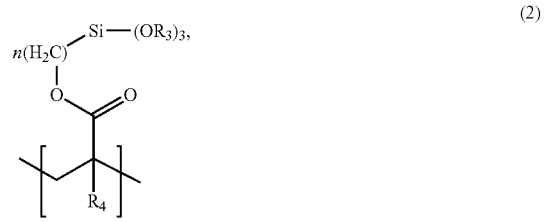

(2)

wherein
each R₃ is independently selected from the group consisting of straight-chain alkyl groups, branched alkyl groups, cyclic alkyl groups, aryl groups, and alkenyl groups;
R₄ is selected from the group consisting of H, straight-chain alkyl groups, branched alkyl groups, cyclic alkyl groups, alkenyl groups, and aryl groups; and n is an integer in a range of 1 to 20.

In addition to being resistant to absorption of oil 306, the lens material 302 is also oxygen permeable. In this regard, the ophthalmic device 300 is generally comfortable for a user when, for example, mounted to a corneal surface of an eye. In an embodiment, the lens material 302 has an oxygen permeability level in a range of about 30 Dk to about 100 Dk.

The ophthalmic device 300 is shown to include a hydrogel 322, such as a biocompatible silicone hydrogel 322, encasing and over-molding the lens material 302. As shown, the hydrogel 322 is shaped to contact a corneal surface of an eye when the ophthalmic device 300 is mounted to an eye. In an embodiment, the hydrogel 322 is wettable to tears. In this regard, the lens material 302 itself may not be wettable to tears due to the wettability of the hydrogel 322 encasing the lens material 302.

As above, the ophthalmic device 300 includes an oil 306 encased by the lens material 302. The oil 306 is immiscible with an aqueous solution, such as the saline solution 308 also encased in the enclosure 304 defined by the lens material 302, such that the oil 306 and the saline solution 308 define an interface. In an embodiment, the oil 306 and saline solution 308 are suitable for electrowetting-based accommodation. In this regard, by applying a bias to the electrode 312 to change a surface energy of the dielectric layer 310 on the electrode 312 from hydrophobic to hydrophilic, an interface between the oil 306 and the saline solution 308 changes shape, thereby providing a lensing effect.

In an embodiment, the controller 318 is operatively coupled to the electrode 312 and includes logic that, when executed by the controller 318, causes the ophthalmic device 300 to perform operations including applying a voltage, such as from the power source 316, to the electrode 312. In this regard, the ophthalmic device 300 is configured to selectively change an optical power of the ophthalmic device 300.

Figure 4:
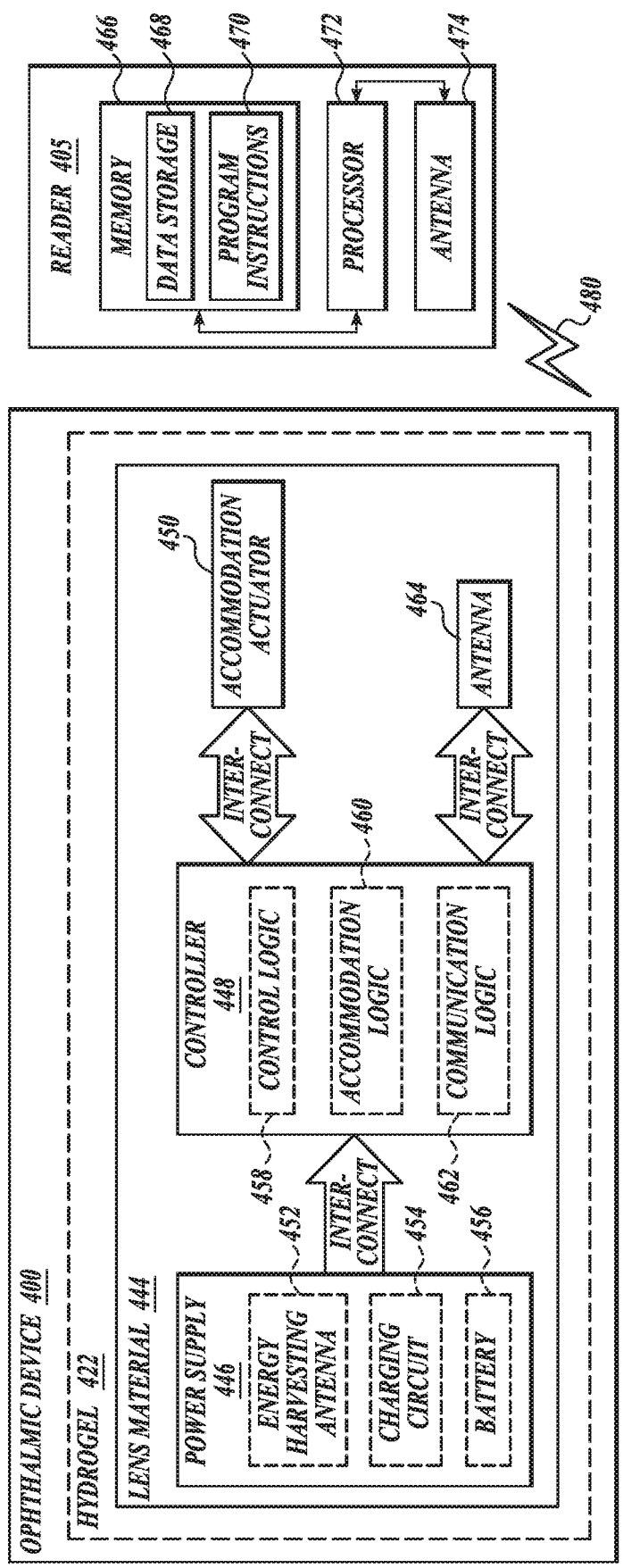
FIG. 4 is a functional block diagram of an ophthalmic device, in accordance with an embodiment of the disclosure.

FIG. 4 is a functional block diagram of an ophthalmic device 400, in accordance with an embodiment of the disclosure. Ophthalmic device 400 may be an electrowetting ophthalmic device 400, such as an electrowetting ophthalmic device 400 shaped to be mounted to a corneal surface of an eye. In an embodiment, electrowetting ophthalmic device 400 is an example of electrowetting ophthalmic device 300.

In the depicted embodiment, electrowetting ophthalmic device 400 includes a lens material 444. In an embodiment, lens material 444 is an example of the lens materials discussed herein with respect to FIGS. 1-3. Lens material 444 can include a copolymer composed of repeating units including: a fluorinated acrylate repeating unit; and a silicon-containing repeating unit, wherein a mass:mass ratio of the fluorinated acrylate repeating unit to the silicon-containing repeating unit is greater than or equal to 2:1. In this regard, the lens material 444 has a high oxygen permeability and resistance to oil absorption, as discussed further herein. In an embodiment, the lens material 444 is shaped to be mounted onto an eye, such as to a corneal surface of an eye. As shown, the ophthalmic device 400 can further include a hydrogel 422, such as a hydrogel encasing the lens material 444. In this regard, the hydrogel 422 may be shaped to be mounted to a corneal surface of any eye.

The lens material 444 is configured to provide a mounting surface for a power supply 446, a controller 448, an antenna 464, and various interconnects. The illustrated embodiment of power supply 446 includes an energy harvesting antenna 452, charging circuitry 454, and a battery 456. The illustrated embodiment of controller 448 includes control logic 458, accommodation logic 460, and communication logic 462.

Power supply 446 supplies operating voltages to the controller 448 and/or the accommodation actuator 450. Antenna 464 is operated by the controller 448 to receive power from external reader 405. In the illustrated embodiment, antenna 464, controller 448, and power supply 446 are disposed on/in lens material 444.

Lens material 444 includes one or more surfaces suitable for mounting controller 448, power supply 446, and antenna 464. Lens material 444 can be employed both as a mounting platform for chip-based circuitry (e.g., by flip-chip mounting) and/or as a platform for patterning conductive materials (e.g., gold, platinum, palladium, titanium, copper, aluminum, silver, tantalum, niobium, metals, other conductive materials, combinations of these, etc.) to create electrodes, interconnects, antennae, etc. In some embodiments, substantially transparent conductive materials (e.g., indium tin oxide or silver nanowire mesh) can be patterned on lens material 444 to form circuitry, electrodes, etc. For example, antenna 464 can be formed by depositing a pattern of gold or another conductive material on lens material 444. Similarly, interconnects can be formed by depositing suitable patterns of conductive materials on lens material 444. A combination of resists, masks, and deposition techniques can be employed to pattern materials on lens material 444.

Electrowetting ophthalmic device 400 can alternatively be arranged with a group of unconnected substrates rather than a single lens material 444. For example, controller 448 and power supply 446 can be mounted to one lens material 444, while antenna 464 is mounted to another substrate and the two can be electrically connected via interconnects.

In the illustrated embodiment, power supply 446 includes a battery 456 to power the various embedded electronics, including controller 448. Battery 456 may be inductively charged by charging circuitry 454 and energy harvesting antenna 452. In one embodiment, antenna 464 and energy harvesting antenna 452 are independent antennae, which serve their respective functions of energy harvesting and communications. In another embodiment, energy harvesting antenna 452 and antenna 464 are the same physical antenna that are time shared for their respective functions of inductive charging and wireless communications with external reader 405. Additionally or alternatively, power supply 446 may include a solar cell ("photovoltaic cell") to capture energy from incoming ultraviolet, visible, and/or infrared radiation. Furthermore, an inertial power scavenging system can be included to capture energy from ambient vibrations.

Charging circuitry 454 may include a rectifier/regulator to condition the captured energy for charging battery 456 and/or directly power controller 448. Charging circuitry 454 may also include one or more energy storage devices to mitigate high frequency variations in energy harvesting antenna 452. For example, one or more energy storage devices (e.g., a capacitor, an inductor, etc.) can be connected to function as a low-pass filter.

Controller 448 contains logic to choreograph the operation of the other embedded components. Control logic 458 controls the general operation of electrowetting ophthalmic device 400, including providing a logical user interface, power control functionality, etc. Accommodation logic 460 includes logic for receiving signals from sensors monitoring the orientation of the eye, determining the current gaze direction or focal distance of the user, and manipulating accommodation actuator 450 (focal distance of the contact lens) in response to these physical cues. The auto-accommodation can be implemented in real-time based upon feedback from gaze tracking, or permit the user to select specific accommodation regimes (e.g., near-field accommodation for reading, far-field accommodation for regular activities, etc.). Communication logic 462 provides communication protocols for wireless communication with external reader 405 via antenna 464. In one embodiment, communication logic 462 provides backscatter communication via antenna 464 when in the presence of an electromagnetic field 480 output from external reader 405. In one embodiment, communication logic 462 operates as a smart wireless radio-frequency identification ("RFID") tag that modulates the impedance of antenna 464 for backscatter wireless communications. The various logic modules of controller 448 may be implemented in software/firmware executed on a general purpose microprocessor, in hardware (e.g., application specific integrated circuit), or a combination of both.

Electrowetting ophthalmic device 400 may include various other embedded electronics and logic modules. For example, a light source or pixel array may be included to provide visible feedback to the user. An accelerometer or gyroscope may be included to provide positional, rotational, directional or acceleration feedback information to controller 448.

The illustrated embodiment also includes external reader 405 with a processor 472, an antenna 474, and memory 466. Memory 466 in external reader 405 includes data storage 468 and program instructions 470. As shown external reader 405 may be disposed outside of ophthalmic device 400, but may be placed in its proximity to charge ophthalmic device 400, send instructions to ophthalmic device 400, and/or extract data from ophthalmic device 400.

In one embodiment, external reader 405 may resemble a conventional contact lens holder that the user places ophthalmic device 400 in at night to charge, extract data, clean the lens, etc.

External reader 405 includes antenna 474 (or group of more than one antenna) to send and receive wireless signals 480 to and from ophthalmic device 400. External reader 405 also includes a computing system with processor 472 in communication with memory 466. Memory 466 is a non-transitory computer-readable medium that can include, without limitation, magnetic disks, optical disks, organic memory, and/or any other volatile (e.g., RAM) or non-volatile (e.g., ROM) storage system readable by the processor 472. Memory 466 an include a data storage 468 to store indications of data, such as data logs (e.g., user logs), program settings (e.g., to adjust behavior of ophthalmic device 400 and/or external reader 405), etc. Memory 466 can also include program instructions 470 for execution by processor 472 to cause the external reader 405 to perform processes specified by the instructions 470. For example, program instructions 470 can cause external reader 405 to provide a user interface that allows for retrieving information communicated from ophthalmic device 400 or allows transmitting information to ophthalmic device 400 to program or otherwise select operational modes of ophthalmic device 400. External reader 405 can also include one or more hardware components for operating antenna 474 to send and receive wireless signals 480 to and from ophthalmic device 400.

External reader 405 can be a smart phone, digital assistant, or other portable computing device with wireless connectivity sufficient to provide the wireless communication link 480. External reader 405 can also be implemented as an antenna module that can be plugged into a portable computing device, such as in an embodiment where the communication link 480 operates at carrier frequencies not commonly employed in portable computing devices. In some instances, external reader 405 is a special-purpose device configured to be worn relatively near a wearer's eye to allow the wireless communication link 480 to operate with a low power budget. For example, the external reader 405 can be integrated in a piece of jewelry such as a necklace, earing, etc. or integrated in an article of clothing worn near the head, such as a hat, headband, etc.

Now the lens materials of the present disclosure will be described in further detail with reference to the Examples below. However, it will be understood that the lens materials and ophthalmic devices of the present disclosure are not restricted by such Examples.

EXAMPLES

Example 1

Lens Material Synthesis

Formulations N32, N11, N62, and N67, made from solutions of equal weight percentages, described below, were polymerized by cast molding in a low-oxygen environment using UV photo-initiation including illuminating the formulation with light having a 365 nm wavelength to form clear, mechanically-stable lens articles and/or optical flat samples having a thickness of about 250 microns and a diameter of about 20 mm. Typical cure times are on the order of 30 minutes.

Formulations:

N32 (Dk=137): 1000 uL of hexafluoroisopropylmethacrylate (HFMA); 1000 uL of 3-[Tris(trimethylsiloxy)silyl] propyl methacrylate (TRIS-MA); and 200 uL neopentyl glycol dimethacrylate (NPDMA).

N11 (Dk=78): 1500 uL of HFMA; 500 uL of TRIS-MA; and 200 uL of ethylene glycol dimethacrylate (EGDMA).

N67 (Dk=56): 500 uL of trifluoroethylmethacrylate (TFEMA); 500 uL of HFMA; 500 uL of TRIS-MA; and 150 uL of EGDMA.

N62 (Dk=45): 1000 uL of TFEMA; 500 uL of TRIS-MA; and 150 uL of EGDMA.

All formulation examples also include Darocur 1173 photoinitiator at approximately 1% w/w.

Example 2

Oil Uptake Measurements

Oil uptake measurements were made according to the following procedure: Optical flats are cast molded and weighed. The optical flats are vacuum annealed at 100° C. for at least 40 hours, then reweighed, noting any mass loss due to inherent volatile content. The optical flats are exposed to an aliquot of an oil component and incubated at a temperature (e.g. 37° C. or 60° C.) for a set time (e.g. 10 days).

Incubated samples are blotted with a lint-free wipe to remove surface oil, and then reweighed. Mass change, as a percent, is calculated as: (incubated mass-annealed mass)/ (annealed mass)*100%. Note that displayed mass increase is capped at 10%.

From the measured data illustrated in FIGS. 1 and 2, it may be observed that the formulation (N32) comprising the highest content of silicon-containing repeating unit (TRIS-MA) has the poorest resistance to the oil components for electrowetting ophthalmic devices at incubation temperatures of 37° C. and 60° C. Furthermore, it may be generalized that the uptake of linear siloxane oil is worse than the cyclic siloxanes, as well as germane oil. However, formulations N11, N62, and N67 exhibit very good resistance to siloxane oils as well as germane oil. Of these formulations, N11 is shown to have both the best resistance to absorption of siloxane oils and germane oil and the best oxygen permeability (Dk=78).

In consideration of these observations, it may be generalized that photopolymerizable lens material formulations comprising copolymers derived from fluorinated methacrylate monomers, siloxane methacrylate monomers and aliphatic dimethacrylate crosslinkers have been found to exhibit surprisingly favorable resistance to absorption of siloxane and germane oils when the mass:mass ratio of fluorinated methacrylate to siloxane methacrylate is approximately 2:1 or higher. This generalization holds over the temperature range of room temperature to at least 60° C. An advantageous combination of such properties (Dk and low oil uptake) is realized, in particular, with formulation N11.

Some processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens material for use in an electrowetting ophthalmic device, the lens material comprising a copolymer composed of repeating units including:
   a fluorinated acrylate repeating unit; and
   a silicon-containing repeating unit,
   wherein a mass:mass ratio of the fluorinated acrylate repeating unit to the silicon-containing repeating unit is greater than or equal to 2:1,
   wherein the lens material has an oxygen permeability level in a range of about 30 Dk to about 100 Dk.

2. The lens material of claim 1, wherein the fluorinated acrylate repeating unit has a formula (1):

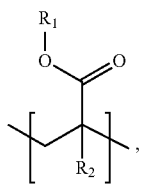

wherein
   $R_1$ is selected from the group consisting of fluorinated straight-chain alkyl groups, fluorinated branched alkyl groups, fluorinated cyclic alkyl groups, fluorinated aryl groups, and fluorinated alkenyl groups; and
   $R_2$ is selected from the group consisting of H, straight-chain alkyl groups, branched alkyl groups, cyclic alkyl groups, alkenyl groups, and aryl groups.

3. The lens material of claim 2, wherein the fluorinated acrylate repeating unit is derived from a fluorinated methacrylate monomer selected from the group consisting of a hexafluoroisopropyl methacrylate monomer, a trifluoroethyl methacrylate monomer, and combinations thereof.

4. The lens material of claim 1, wherein the silicon-containing repeating unit is derived from a monomer selected from the group consisting of a silyl methacrylate monomer, a silyl styrene monomer, and combinations thereof.

5. The lens material of claim 4, wherein the silicon-containing repeating unit has a formula (2):

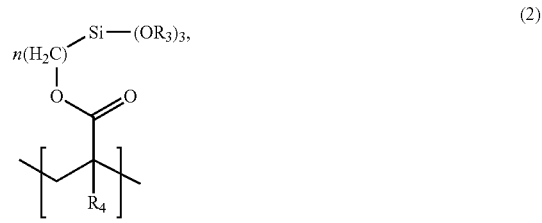

wherein
   each $R_3$ is independently selected from the group consisting of straight-chain alkyl groups, branched alkyl groups, cyclic alkyl groups, aryl groups, and alkenyl groups;
   $R_4$ is selected from the group consisting of H, straight-chain alkyl groups, branched alkyl groups, cyclic alkyl groups, alkenyl groups, and aryl groups; and
   n is an integer in a range of 1 to 20.

6. The lens material of claim 1, wherein the silicon-containing repeating unit is 3-[tris(trimethylsiloxy)silyl]propyl methacrylate.

7. The lens material of claim 1, wherein the mass:mass ratio of the fluorinated acrylate repeating unit to the silicon-containing repeating unit is in a range of about 2:1 to about 100:1.

8. The lens material of claim 1, further comprising a crosslinking agent.

9. The lens material of claim 8, wherein the crosslinking agent is selected from the group consisting of butanediol dimethacrylate, ethylene glycol dimethacrylate, diethylene glycol dimethacrylate, triethylene glycol dimethacrylate, propylene glycol dimethacrylate, dipropylene glycol dimethacrylate, allylmethacrylate, vinylmethacrylate, trimethylolpropane trimethacrylate, neopentyl glycol dimethacrylate, and combinations thereof.

10. The lens material of claim 1, wherein the lens material is configured to absorb less than 1 wt % of an oil after contacting an excess of the oil for 10 days at 37° C.

11. An ophthalmic device comprising:
    a lens material comprising a copolymer composed of repeating units including:
       a fluorinated acrylate repeating unit; and
       a silicon-containing repeating unit,
       wherein a mass:mass ratio of the fluorinated acrylate repeating unit to the silicon-containing repeating unit is greater than or equal to 2:1, and
    wherein the lens material defines an enclosure encasing an oil,
    wherein the lens material has an oxygen permeability level in a range of about 30 Dk to about 100 Dk.

12. The ophthalmic device of claim 11, wherein the fluorinated acrylate repeating unit has a formula (1):

wherein
R₁ is selected from the group consisting of fluorinated straight-chain alkyl groups, fluorinated branched alkyl groups, fluorinated cyclic alkyl groups, fluorinated aryl groups, and fluorinated alkenyl groups; and R₂ is selected from the group consisting of H, straight-chain alkyl groups, branched alkyl groups, cyclic alkyl groups, alkenyl groups, and aryl groups.

13. The ophthalmic device of claim 11, wherein the silicon-containing repeating unit has a formula (2):

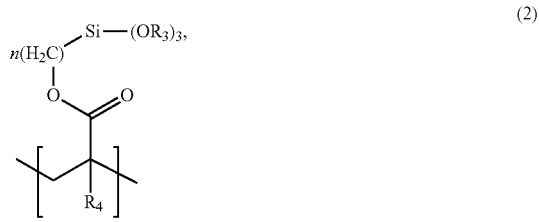

wherein
each R₃ is independently selected from the group consisting of straight-chain alkyl groups, branched alkyl groups, cyclic alkyl groups, aryl groups, and alkenyl groups;

R₄ is selected from the group consisting of H, straight-chain alkyl groups, branched alkyl groups, cyclic alkyl groups, alkenyl groups, and aryl groups; and n is an integer in a range of 1 to 20.

14. The ophthalmic device of claim 11, wherein the mass:mass ratio of the fluorinated acrylate repeating unit to the silicon-containing repeating unit is in a range of about 2:1 to about 100:1.

15. The ophthalmic device of claim 11, wherein the oil is selected from the group consisting of a hydrocarbon oil, a silicone oil, and a germane oil.

16. The ophthalmic device of claim 15, wherein the lens material is configured to absorb less than 1 wt % of the oil after contacting an excess of the oil for 10 days at 37° C.

17. The ophthalmic device of claim 11, wherein the lens material further encases in the enclosure a saline solution immiscible with the oil.

18. The ophthalmic device of claim 11, further comprising a silicone hydrogel encasing the copolymer shaped to contact a corneal surface of an eye when the ophthalmic device is mounted to the eye.

* * * * *